No. 806,097. PATENTED DEC. 5, 1905.
E. BAUMANN.
FOLDING VEHICLE.
APPLICATION FILED NOV. 17, 1904.
2 SHEETS—SHEET 1.
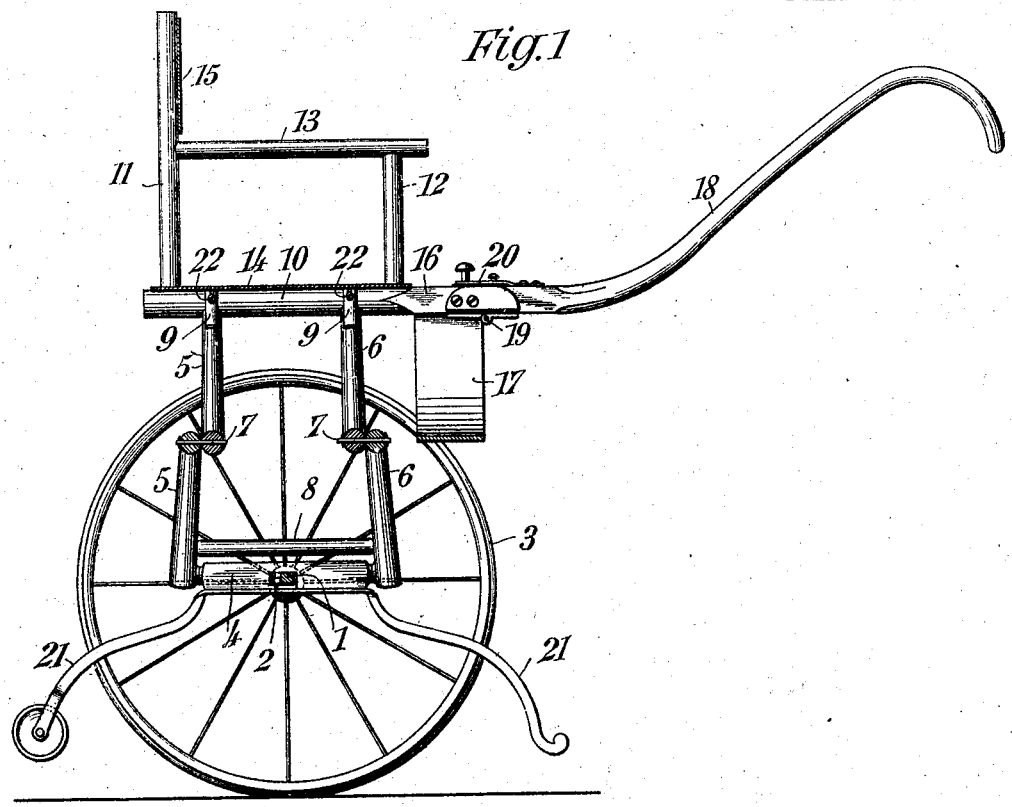
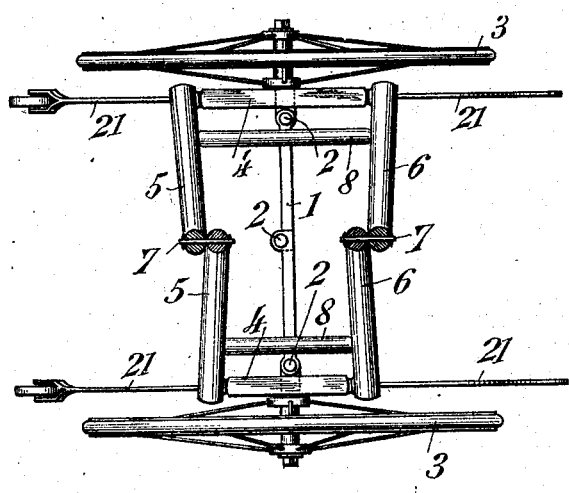
Witnesses:
Harry L. Amer
A. Sommers
Inventor:
Emil Baumann
by Henry Orth, attys.

No. 806,097. PATENTED DEC. 5, 1905.
E. BAUMANN.
FOLDING VEHICLE.
APPLICATION FILED NOV. 17, 1904.
2 SHEETS—SHEET 2.
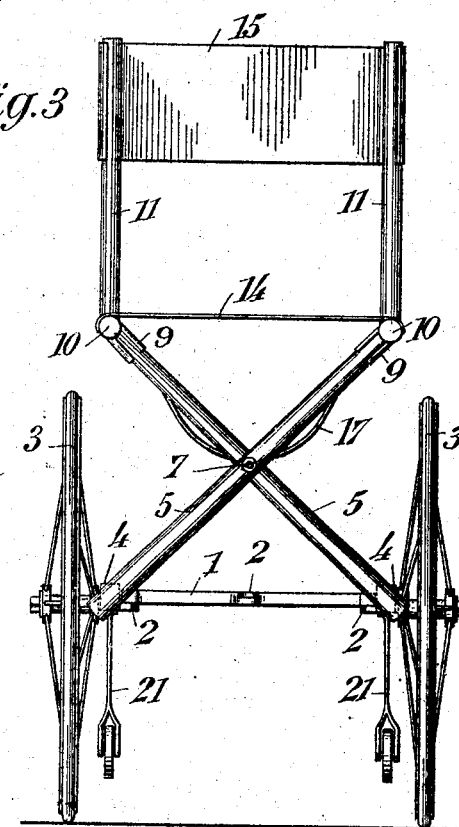
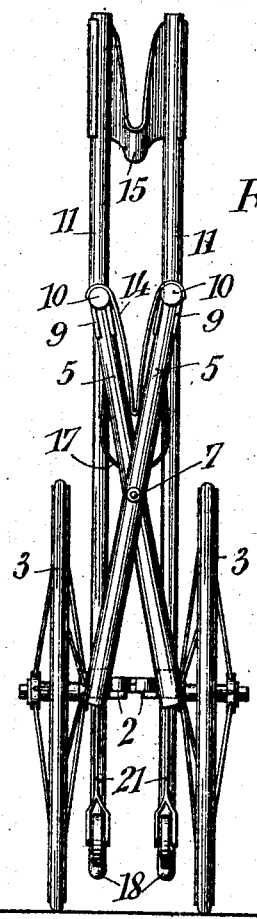
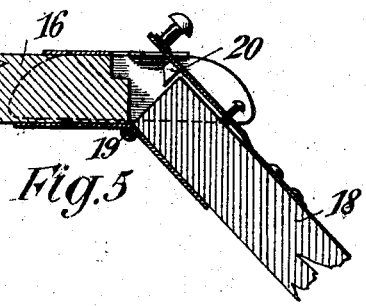
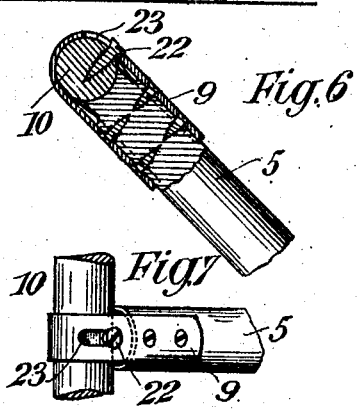
Witnesses:
Harry L. Amer
B. Dommers
Inventor:
Emil Baumann.
by Henry Orth
attys.

UNITED STATES PATENT OFFICE.

EMIL BAUMANN, OF HORGEN, SWITZERLAND.

FOLDING VEHICLE.

No. 806,097.     Specification of Letters Patent.     Patented Dec. 5, 1905.

Application filed November 17, 1904. Serial No. 233,168.

*To all whom it may concern:*

Be it known that I, EMIL BAUMANN, a citizen of the Republic of Switzerland, residing at Horgen, Switzerland, have invented new and useful Improvements in Folding Vehicles, of which the following is a specification.

This invention has relation to vehicles; and it consists, broadly, in a vehicle foldable in a horizontal plane at right angles to its longitudinal axis.

A characteristic feature of my invention resides in the combination of a sectional jointed wheel-axle, a seat-support, and a seat having back and arm rests, said parts adapted to be folded in a horizontal plane at right angles to the longitudinal axis of the vehicle.

A further feature of my invention lies in the combination, with such a vehicle, of a pole or shafts adapted to be turned down or folded between the wheels when the vehicle is folded.

That my invention may be fully understood I will describe the same in detail, reference being had to the accompanying drawings, illustrating a two-wheeled vehicle embodying my invention, and in which—

Figure 1 is a side elevation, partly in section; Fig. 2, a horizontal section; Fig. 3, a rear elevation; and Fig. 4, a similar view, the latter showing the vehicle folded; and Figs. 5, 6, and 7 are detail views.

The wheel-axle 1 is composed of four sections hinged together at the points 2, so that by applying the power, for instance, at or near the longitudinal center of said axle its sections will be contracted or folded up, as shown in Fig. 4, the two central sections being projected forwardly in a plane at right angles to the plane of the axle, as will be readily understood.

On the outer sections of the axle 1 are mounted the wheels 3 in any usual or preferred manner, and to said outer sections, on the inner side of the wheels, are secured longitudinal bearers 4 for the seat-support. This support is formed of two pairs of crossed legs 5 5 and 6 6, pivoted at their points of intersection 7, the lower ends of one pair of legs 5 being journaled or otherwise rotatably connected to the rear end of the bearers 4, while the lower end of the legs 6 is similarly connected to the forward end of said bearers 4, as clearly shown in Fig. 2. Each of the legs 5 and 6 is provided at its upper end with a strap 9, slotted as shown at 23, Fig. 6, in which straps are journaled the longitudinal seat-bars 10, a screw-bolt 22 limiting the rotation of the legs 5 and 6 on said bars 10, which are extended beyond the forward uprights 12 and connected together by a piece of flexible material 14, as canvas or the like, which constitutes the seat. Upright bars 11, of greater height than the uprights 12, are secured to the longitudinal bars 10 at their rear ends and are connected to the uprights 12 by arm-rests 13 and to each other by a flexible strip of material 15, as canvas or the like, which constitutes the back of the seat. The extensions 16 of the seat-bars 10 are also connected together by a loose or loop-like piece of fabric 17, which constitutes the foot-rest, and to said extensions are hinged at 19 the shafts 18, any suitable means being provided to lock said shafts in a normal position—for instance, a spring-catch 20, Fig. 5, adapted to engage a suitable keeper and provided with a handle for disengaging said catch from its said keeper.

It is obvious that when the wheel-axle is contracted or folded the legs 5 and 6 will also fold together, as well as the side bars 10 13 and the uprights 11 12 of the seat, as shown in Fig. 4, thus raising the seat and shafts 18, hinged thereto, a considerable distance, sufficient to permit the shafts to be turned down or folded between the wheels, as shown in said Fig. 4.

From the described construction it will readily be seen that the weight of the occupant of the vehicle will maintain the same unfolded, and as the crossed legs 5 and 6 are connected to the ends of the bearers 4 they will keep the wheel-axle also extended or unfolded.

To prevent the vehicle from tilting either backward or forward when in use or when folded, I secure to each bearer 4 a bar having downwardly-projecting legs 21 at each end, the forward legs, projecting forwardly, being curved upwardly to prevent them from engaging the ground, while the rear legs, which project rearwardly, are preferably provided with small wheels, as shown.

I do not desire to limit myself to the details of construction described, as these may be varied in many ways without departing from the nature or spirit of my invention.

Having thus described my invention, what I claim as new therein, and desire to secure by Letters Patent, is—

1. In a vehicle, the combination with a foldable body and a foldable wheel-axle, of pivoted crossed legs supported on the axle and supporting the body, whereby the weight of the load will keep the vehicle in unfolded position, substantially as described.

2. In a vehicle, the combination with a body foldable on a longitudinal plane, of a foldable wheel-axle whose parts are pivoted together and crossed legs pivoted together at substantially right angles to the pivots in the axle, said legs supported from the axle and supporting the foldable body, whereby the parts of the wheel-axle will be moved horizontally to fold the body and the legs be moved at right angles to the direction of movement of the foldable axle to fold, the weight of the load keeping the vehicle in unfolded position, substantially as described.

3. In a vehicle, the combination with a foldable body, shafts hinged thereto and a foldable wheel-axle, each of said parts foldable into different planes and each of the planes at right angles to the others, substantially as described.

4. In a vehicle, the combination of two pairs of crossed legs pivoted together at their crossing-points, and a jointed axle fixed to the lower ends of said legs and provided with wheels on its ends, substantially as described.

5. In a vehicle, the combination of two pairs of crossed legs pivoted together at their crossing-points, a jointed wheel-axle, and bearers attached thereto to which the lower ends of the said legs are pivoted, substantially as described.

6. In a vehicle, the combination of two pairs of crossed legs pivoted together at their crossing-points, a jointed wheel-axle and bearers on the axle, substantially as described.

7. In a vehicle, the combination of two pairs of crossed legs pivoted together at their crossing-points, a jointed wheel-axle, arm-rests, bars connecting the ends of the legs, and shafts connected to said bars, substantially as described.

8. A vehicle, comprising a wheel-axle jointed to fold in a horizontal plane, a seat, and seat-supports jointed together and to the wheel-axle to fold into a vertical longitudinal plane and elevate the seat; in combination with shafts jointed to the seat to fold between the wheels when the vehicle is folded, substantially as described.

9. In a vehicle, the combination of two pairs of crossed legs pivoted together at their crossing-points, a jointed wheel-axle, arm-rests, bars connecting the legs, shafts attached to the said bars, and fastening-catches attached to the said bars and to the shafts, substantially as described.

10. In a vehicle, the combination of two pairs of crossed legs pivoted together at their crossing-points, a jointed wheel-axle, arm-rests, bars connecting the upper ends of the legs, and a folding foot-rest attached to said bars, substantially as described.

In testimony whereof I have signed my name to this specification in the presence of two subscribing witnesses.

EMIL BAUMANN.

Witnesses:
A. LIEBERKNECHT,
E. BLUM.